(No Model.) 2 Sheets—Sheet 2.
H. MILLER.
Soldering Machine or Apparatus.
No. 242,955. Patented June 14, 1881.
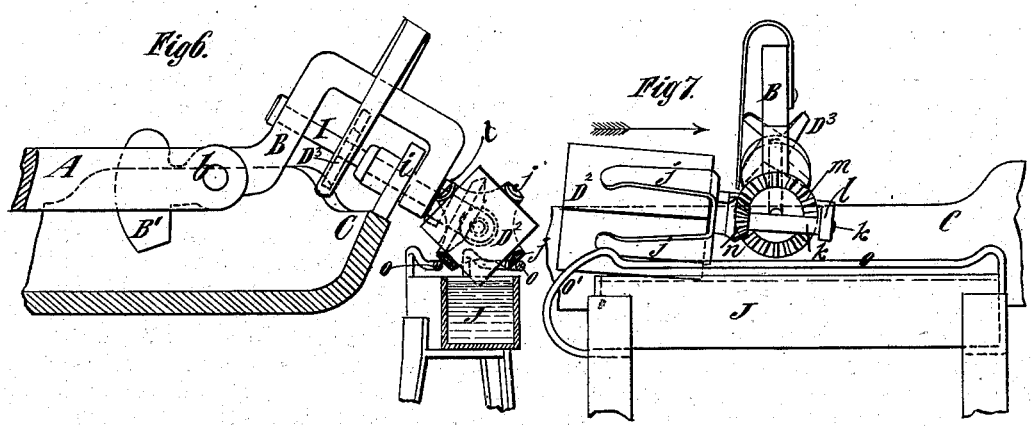
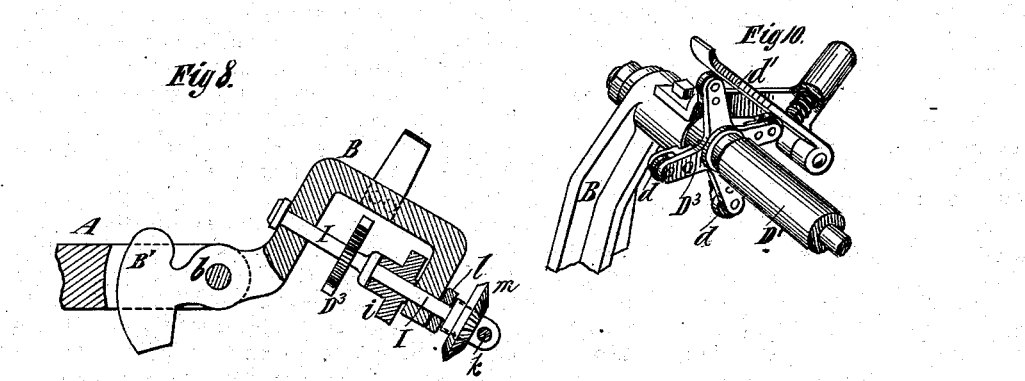
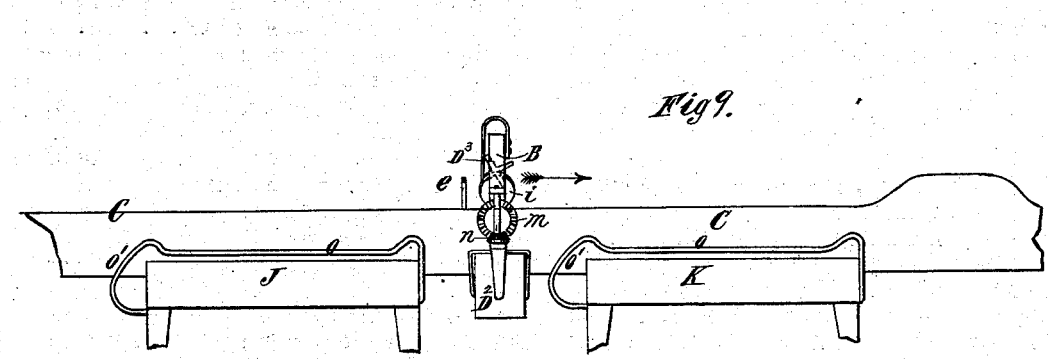
Witnesses
Inventor
Herman Miller

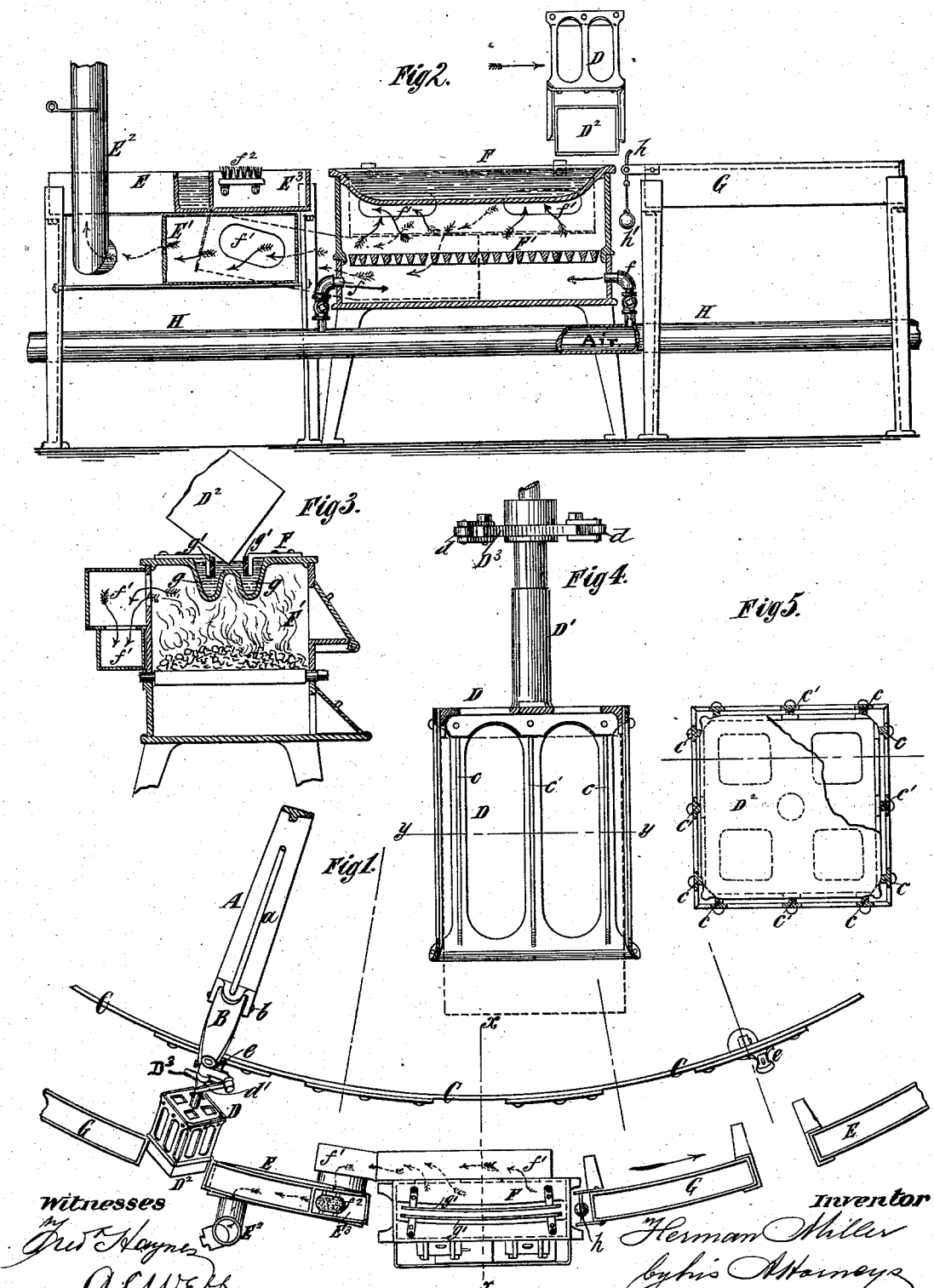

UNITED STATES PATENT OFFICE.

HERMAN MILLER, OF NEW YORK, N. Y.

SOLDERING MACHINE OR APPARATUS.

SPECIFICATION forming part of Letters Patent No. 242,955, dated June 14, 1881.

Application filed February 23, 1881. (No model.)

*To all whom it may concern:*

Be it known that I, HERMAN MILLER, of New York, in the county of New York and State of New York, have invented certain new and useful Improvements in Soldering Machines or Apparatus, of which the following is a specification.

My invention relates to machines or apparatus for soldering sheet-metal cans, in which the cans are inserted in holders or baskets carried by traveling or traversing carriers, and while in said holders or baskets have their margins automatically immersed in a bath of molten solder, or primarily in an acid or other flux bath, then in a bath of molten solder, and subsequently, if necessary, in a water or cooling receptacle or trough, which operations or immersions may be repeated by employing consecutive series of said baths and receptacles or troughs for soldering a single seam, or for successively soldering several seams or sides of a can, according to the shape or description of the can.

A machine or apparatus of the kind above described is shown and described in Letters Patent No. 190,888, granted to me May 15, 1877, and in said machine the can-carriers are moved over a sinuous track, which permits them to drop or move downward sufficiently to immerse the seam to be soldered in the acid and solder baths and in the water trough or receptacle, and which raises them after the passage of the can past each bath to enable the can to be transferred from one bath to the next.

The invention consists in the combination, in a soldering-machine, of one or more traveling carriers and holders for cans, one or more solder-baths, one or more acid or flux baths, through one of which the can must pass before it reaches a solder-bath, and means for heating the acid or flux baths to heat the cans before they reach the solder-baths.

It also consists in the combination, with the aforesaid carriers and holders and one or more solder-baths, of a novel arrangement of a scraper for removing any surplus solder from the can after it has been immersed in a soldering-bath.

It also consists in certain novel features in the construction of the holders or baskets into which the cans are inserted.

It also consists in a novel manner of supporting the carriers and holders, and connecting them with the means by which their traveling or traversing movement is imparted to them, in combination with solder-baths, or both solder and acid baths having parallel guides extending across them, whereby I provide a machine for soldering the side seams of cans.

In the accompanying drawings, Figure 1 represents a plan view of a portion of a circular machine or apparatus, and a radial can holder and carrier by which the cans are moved. Fig. 2 represents a front elevation, upon a larger scale, of an acid-bath, a solder-bath, and a water trough or receptacle for cooling. Fig. 3 represents a transverse section of a solder-bath upon the dotted line *x x*, Fig. 1. Fig. 4 represents a vertical section of a can-holder or basket. Fig. 5 represents a transverse section thereof upon the dotted line *y y*, Fig. 4. Fig. 6 represents a transverse section through an acid-bath and a can holder and carrier supported in a novel manner to adapt the machine for soldering side seams. Fig. 7 represents a side view of such acid-bath, and an end view of the carrier and holder. Fig. 8 represents a longitudinal section through the can-carrier, which supports the basket or holder in Figs. 6 and 7. Fig. 9 represents a diagram of two baths and a can-holder, which illustrates the holder as passing from one bath to another; and Fig. 10 represents a perspective view, upon a larger scale, of the can holder and carrier shown in Fig. 1.

Similar letters of reference designate corresponding parts in all the figures.

The form of machine or apparatus which I prefer to use is circular, and in Fig. 1 I have illustrated a segmental portion of such an apparatus.

Referring, first, to Figs. 1 to 5, inclusive, which show the machine as adapted for soldering the bottom seams of cans, A designates an arm, which is fixed to a central shaft, (not here shown,) so that as said shaft is rotated the arm moves in a circular path. Several of these radial arms are intended to be used, and each may be supported, in part, by a tension brace or rod, *a*, extending inward and upward to a common rotary collar.

B designates a can-carrier, which is pivoted in the arm A at *b*, and is thus free to move upward and downward, and the carrier has pivoted in it a wheel or roller like that shown in my above-referred-to Letters Patent No. 190,888, which rides upon a sinuous track, C, by which the vertical position of the can-carrier B is determined.

D designates a can holder or basket, which is best shown in Figs. 4 and 5, and which has a projecting stem or shaft, D', whereby it is held in the can-carrier B. The holder or basket is here shown as adapted to receive a square or rectangular can, $D^2$, and is composed of a skeleton-frame provided internally with longitudinal ribs $c$, which are adapted to bear upon the can near the edge of each side. Cans of large size are usually paneled in each side for the purpose of increasing their strength, and, as clearly shown in Fig. 5, the ribs $c$ have laterally-inclined faces, which bear upon the beveled or inclined edges of the panels in the can and properly center it. The can holder or basket may also be provided upon each side with an intermediate longitudinal rib, $c'$, to aid in supporting the can. When thus constructed the ribs $c$ $c'$ produce enough friction upon the can to prevent its falling out, but by a little force it may be readily drawn out and another can inserted. The can-holder without the longitudinal ribs would bear upon the bulging parts of the can only, and would not hold the can reliably steady. The ribs make definite holding-surfaces, and bear upon the cans where they are of uniform size.

The stem D' of the can holder or basket D is free to turn in bearings in the can-carrier B, and upon said stem is fixed a star-wheel, $D^3$, carrying rollers $d$ at the extremity of its arms. At proper intervals along the sinuous track C are stationary stops or projections $e$, which are in the path of the rollers $d$ on the star-wheel $D^3$, and as the can-carrier B reaches one of these stops one of its arms bears thereon and the can holder or basket D and its contained can are turned one-quarter of a revolution, or such a fraction of a revolution as the can has sides, as more fully hereinafter described. After being turned the can holder or basket is held by a spring-arm, $d'$, acting upon the star-wheel $D^3$, as shown in Figs. 1 and 10.

In Figs. 1 and 2 I have represented an acid or flux bath, E, for cleaning the can, a solder-bath, F, for soldering the can, and a water trough or receptacle, G, for cooling the can, and the machine or apparatus should have as many of each of these baths and troughs or receptacles as the cans to be soldered have sides. For a rectangular can there should be four acid-baths, four solder-baths, and four water-troughs, if the can-carriers describe a full circle to solder a can, or double that number if the can-carriers describe only a semicircle to solder one can; but if a six-sided can were to be soldered there should be six acid and solder baths and six water-troughs.

Under the solder-bath F is a fire-place, F', containing a grate for fuel, and the air necessary for combustion may be supplied by a blast-pipe, H, which communicates with the several fire-places of all the solder-baths in the machine by branches $f$ under control of suitable cocks or valves.

It is also very desirable that the acid-baths should be heated to heat the cans before they reach the solder-baths, and this may be very conveniently done by carrying the waste heat from the fire-place F' under the acid-bath. At the back of the solder-bath fire-place F' is a flue, $f'$, which conducts the products of combustion into a chamber, E', under the solder-bath E, whence they escape through a smoke-pipe, $E^2$, and thence to the atmosphere.

It is also desirable to remove all superfluous acid from the seam of the can after it has passed through the acid, and to effect this I arrange a drip-pan, $E^3$, between each acid or flux bath and its adjacent solder-bath F, and in the drip-pan I arrange a stationary brush, $f^2$, over and in contact with which the can passes, and by which the surplus acid or flux is removed.

Solder rapidly oxidizes when exposed to the air, and it is very desirable that a bright and unoxidized surface should be kept upon that part of the solder-bath F through which the can passes. To effect this I construct the bath in a novel manner, as clearly shown in Figs. 1 and 3. The cavity or receptacle for solder has two deep legs, $g$ $g$, and a shallow portion between the legs and in the path of the can $D^2$; and $g'$ represents longitudinal strips between which the can passes, and the edges of which project below the level of the solder. The solder is placed in the bath outside the strips $g'$, and can only get between them by passing under their lower edges, and hence a bright surface is maintained between the strips, while the dross and oxide are kept outside of the strips. After the can has passed through the solder-bath it is desirable that all the superfluous solder be removed, and to effect this I arrange a scraper, $h$, between the solder-bath and the adjacent water trough or receptacle G, over and in contact with which the can passes in moving from the solder-bath to the water-trough. The scraper $h$ is pivoted, and is retained in an upright position by a weight, $h'$, except when deflected by a can passing over it.

The construction and manner of operation of the sinuous track C is clearly shown in my above-mentioned Letters Patent No. 190,888, and it should be so proportioned as to raise the can-carrier, can-holder, and can just before the can reaches the end of the acid-bath and hold them raised until the can is over the solder-bath, and to again raise the can-carrier as the can approaches the end of the solder-bath and hold it raised until the can is over the water-trough, and so on during the whole operation of soldering the can.

If round cans are to be soldered, means should be provided for turning the cans a full revolution in the acid and solder baths and in the water trough or receptacle.

Rectangular cans have frequently only two side or corner seams, two sides being formed of a single sheet and the two seams being at diagonally opposite corners, and I will now describe the arrangement for soldering such corner seams, as shown in Figs. 6 to 9, inclusive.

A designates the radial arm, to which the carrier B is pivoted at $b$, and C designates the sinuous track. The carrier B has a counterbalance, B′, and $i$ designates a roller or wheel by which it is supported on the track C.

I designates a shaft adapted to turn in bearings in the carrier, and having loose upon it the wheel or roller $i$, and fast upon it the star-wheel $D^3$, which in the previously-described modification of my invention is upon the stem D′ of the holder or basket D.

The can-holder in this instance comprises spring-arms $j$, which hold the can $D^2$ between them, and a stem or shaft, $k$, which is mounted in bearings in a yoke, $l$, loosely fitted upon the shaft I, thus supporting the can-holder transversely to the said shaft I, to which it is geared by a bevel-wheel, $m$, on said shaft engaging with a pinion, $n$, upon the stem or shaft $k$ of the can-holder.

J K represent two tanks or baths, which may, for example, be, the first an acid and the second a solder bath, and above these baths are tracks or ways $o$, arranged parallel with each other, as shown in Fig. 6, and adapted to bear upon the arms $j$ of the can-holder. These tanks are sufficiently far apart to enable the seam of the can to just dip into the contents of the bath.

By the two tracks or ways $o$ the can-holder and can are held in a horizontal position, as shown in Fig. 7, while passing over or through a bath; but it is obvious that so long as the can and holder rest upon these tracks they cannot be turned to present a new seam. Therefore the can and holder, as soon as they reach the end of one bath, drop down into a vertical position, as shown in Fig. 9, the yoke $l$ turning freely on the shaft I to permit of this. The star-wheel $D^3$ at this moment strikes a stationary stop or projection, $e$, and is turned a quarter of a turn, which, owing to the difference in size between the wheel $m$ and pinion $n$, causes the can-holder and can to be turned half a turn, so as to properly present a diagonally-opposite seam to be operated on.

As clearly shown in Figs. 7 and 9, the tracks $o$ at the end of the bath which the can approaches first are inclined, as at $o′$, and by such inclined portions the cans and holders are raised gradually and again brought into a horizontal position and carried through or over the bath.

My invention is not limited to a machine or apparatus in which the can-carriers are moved in a circular path, for it might be embodied in any machine having can-carriers traveling or traversing in any direction to present the can successively to a series of baths.

What I claim as my invention, and desire to secure by Letters Patent, is—

1. In a soldering machine or apparatus, the combination of one or more traveling carriers and holders for cans, one or more solder-baths, one or more acid or flux baths, through one of which the can must pass before it reaches a solder-bath, and means for heating the acid or flux baths to heat the cans before they reach the solder-baths, substantially as specified.

2. In a soldering machine or apparatus, the combination of one or more traveling carriers and holders for cans, one or more solder-baths, one or more acid or flux baths, through one of which a can must pass to reach a solder-bath, a fire-place under each solder-bath, and flues leading from the said fire-places for conveying heat to the acid or flux baths, substantially as and for the purpose specified.

3. In a soldering machine or apparatus, the combination of one or more traveling carriers and holders for cans, one or more solder-baths through which the cans are passed, and a stationary scraper for removing surplus solder from the cans after they leave each solder-bath, substantially as specified.

4. In a soldering machine or apparatus, a holder or basket for cans consisting of a skeleton metallic frame having longitudinal ribs upon its interior, which form definite and isolated bearing-surfaces for the cans, substantially as specified.

5. In a soldering machine or apparatus, the combination of traveling carriers, each comprising a rotary shaft, can holders or baskets pivoted transversely to said shafts in said carriers, bevel-wheels connecting said shafts and holders or baskets, and solder-baths, or acid and solder baths, having longitudinal tracks or ways which hold said can holders or baskets in a horizontal position as they pass over said baths, substantially as specified.

6. The combination of the carriers B, having rotary shafts I, the can holders or baskets having the stems or shafts $k$, the yokes $l$, loose upon the shafts I, and comprising bearings for the stems or shafts $k$, the bevel-wheels $m$ $n$, and the baths J K, provided with longitudinal guides $o$, all substantially as specified.

HERMAN MILLER.

Witnesses:
FREDK. HAYNES,
A. C. WEBB.